Oct. 20, 1931.  A. JOPP  1,828,663
MACHINE FOR GRINDING SIMULTANEOUSLY TWO OPPOSED SURFACES OF
ARTICLES OF PRISMATIC OR OTHER SHAPE, ESPECIALLY NUTS
Filed April 22, 1929

Inventor
August Jopp
James L. Norris,
Attorney

Patented Oct. 20, 1931

1,828,663

UNITED STATES PATENT OFFICE

AUGUST JOPP, OF ZELLA-MEHLIS, GERMANY

MACHINE FOR GRINDING SIMULTANEOUSLY TWO OPPOSED SURFACES OF ARTICLES OF PRISMATIC OR OTHER SHAPE, ESPECIALLY NUTS

Application filed April 22, 1929, Serial No. 357,188, and in Germany May 15, 1928.

This invention relates to a machine for grinding simultaneously two opposed surfaces of articles of prismatic or other shape, especially nuts, by which it is possible to automatically grind and, if necessary, finish opposite surfaces.

Where the grinding of opposed faces of articles, such as nuts, is carried out by hand each individual nut must be held several times, according to the number of surfaces, against the grinding surfaces of the grinding wheels, and for finish grinding this work must be repeated. This tedious and lengthy work and the high cost of production resulting therefrom are obviated by the present invention, as by the employment thereof any unskilled operator can carry out the grinding with absolute accuracy.

According to the invention the opposed pairs of surfaces of the nuts are consecutively ground at a single operation because the nuts are fed through a tube of suitable cross section between a plurality of pairs of grinding wheels corresponding to the number of surface pairs of the nuts. The portion of the tube between one pair of grinding wheels and the succeeding pair of grinding wheels is twisted through an arc corresponding to the angularity between adjacent faces of the nut and provided with opposed openings in its length through which opposed grinding wheels may engage opposed faces of the nut.

The grinding wheels are preferably formed each of two cylinders inserted the one in the other of grinding material of different degrees of coarseness, so that the finish grinding of the work (coarse and fine) can be effected at one operation.

An embodiment of the invention is illustrated by way of example in the accompanying drawings in which Fig. 1 is a part top plan view of the machine, one shaft and the grinding wheel carried thereby being in section.

Fig. 2 is a vertical section through the table, one pair of opposed grinding wheels being shown in elevation.

Figure 1:
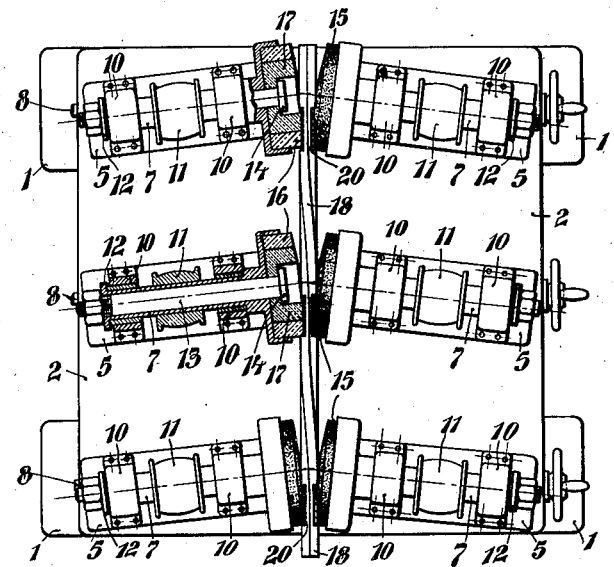
Figure 3:
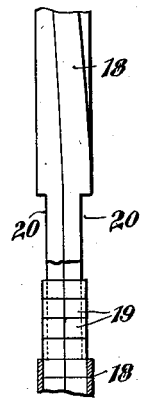
Fig. 3 is a view, partly in plan and partly in longitudinal section, of the guide tube.
Figure 2:
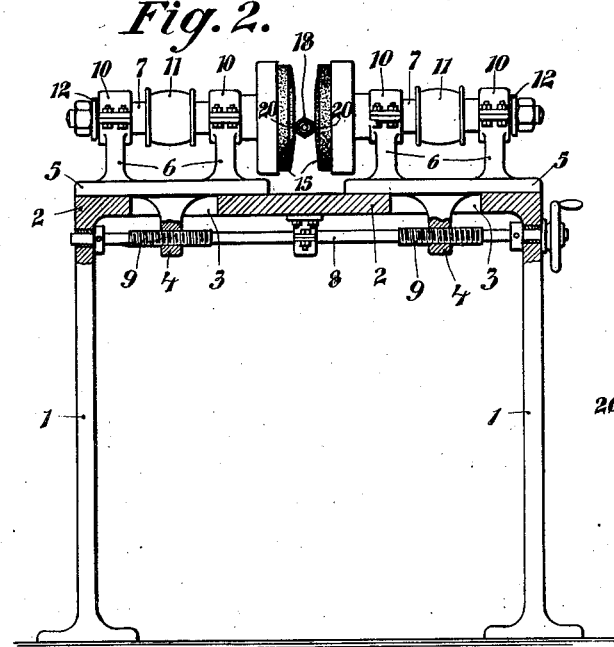
Figure 4:
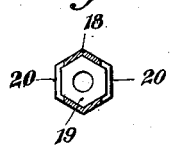
Fig. 4 is a cross section through the guide tube.

The uprights 1 of the machine carry a table 2 having openings 3 through which the extensions 4 of the slide rests 5 pass. Bearing frames 6 are mounted on these slide rests 5 and carry the hollow shafts or spindles 7 of the grinding wheels. For displacing the grinding wheels with their bearings 10, the extensions 4 of the slide rests 5 are connected with a screw spindle 8 having opposite threads 9. By turning this spindle 8 the grinding wheels will be moved parallel to each other. Each of the shafts 7 is provided with a pulley 11 for driving the grinding wheel, and it carries on its outer end a collar 12 which abuts the bearing. A bolt 13 extends through each of the hollow shafts and the head 14 of each of these bolts presses one of the grinding wheels with its bearing surface against one end of one of the hollow shafts, the bolt being secured at the opposite end by means of a nut which bears against one of the collars 12. The grinding wheels are composed of two concentric cylinders 16 and 17 of grinding material of different degrees of coarseness, the outer cylinder 16 having a coarse grain and the inner cylinder 17 a fine grain.

A tube 18 extends between each opposed pair of grinding wheels with its axis offset from a plane passing through the axes of rotation of the grinding wheels. The cross section of this tube corresponds to that of the nuts 19 which in the example illustrated are hexagonal.

Opposed pairs of openings 20 are formed in the tube and the portions of the wall between each opposed pair of openings and the succeeding pair form guides for the nuts between such pairs of openings.

The portions of the tubes in which the openings are provided are straight while the portions of the tubes between the consecutive openings are twisted through an arc corresponding to the angularity between adjacent faces of the article to be ground.

The method of operation will be hereinafter described with reference to the accompanying drawings.

The nuts 19 are introduced continuously into the tube 18, from the front side of the machine and reach the first openings 20 of the tube between the first pair of grinding wheels. As the tube is situated below the axes of these grinding wheels the nuts will be fed forward in the openings by the rotation of the grinding wheels and push the nuts in front of them past the next succeeding pair of openings into which the second pair of grinding wheels extend, which grinding wheels will, in turn, feed the nuts to the third pair of openings into which the third pair of grinding wheels will extend. As the portions of the tube 18 between the openings 20 are twisted the nuts guided in said tube will be correspondingly turned on their axes and present to the next following pair of grinding wheels in the next following openings another pair of opposed faces, so that in the case of hexagonal nuts three pairs of grinding wheels are required for all the surfaces of the nut which are to be ground pairwise. Since the axes of the opposed pairs of grinding wheels cross one another and are oblique to the axis of the tube, their faces are at inclinations to the faces of the article to be ground thereby. This inclination is important also when the faces of the grinding wheels comprise two portions of different degrees of coarseness. The wrench faces of the nuts come first into contact with the outer coarse grained portions of the grinding wheels and after passing such portions are finely ground by the inner finer grained portions, the ground surfaces of the nuts thereafter being free from contact with the grinding wheels, and even free from the coarse grained portions of the grinding wheels.

The grinding wheels are adjusted by turning the spindle 8 mounted in the frame 1. Owing to this adjustability it is possible to compensate for wear of the grinding wheels and further when using the machine for larger nuts the wheels can be moved apart. The finished nuts are delivered at the end of the tube 18 and require no further treatment.

The machine works automatically so that no skilled operator is required. Since two opposed faces of the article are ground simultaneously the grinding time is considerably reduced.

Claims:

1. A machine of the class described comprising a series of grinding wheels arranged in a row with their axes parallel and at an obtuse angle to the line of advance of articles to be ground, said wheels each having a conical grinding surface, said wheels having concentric portions of different degrees of fineness, a tube through which said articles pass and having openings opposite said wheels enabling grinding engagement of the wheels with the articles below the axes of the wheels so that the wheels will feed the articles, and said tube having twisted portions between the wheels whereby the articles will be turned on their axes as they pass through the tube from one pair of wheels to another.

2. A machine for simultaneously grinding a pair of opposite faces and consecutively grinding all of the opposite faces of an article having a polygonal cross section, said machine comprising a tube of the same internal cross-section as the article to be ground and through which the article may pass, said tube having a plurality of pairs of oppositely disposed openings, the openings of each of said pairs being opposite, respectively, a pair of opposite faces of an article to be ground as said article passes said openings, said tube being twisted between each pair of opposed openings and the adjacent pair of openings through an arc corresponding to the angularity between adjacent faces of the article to be ground to present a different pair of opposite faces of such article at each succeeding pair of said openings as such article passes through said tube; and substantially conical grinding wheels corresponding in number to the faces of the article to be ground and mounted in opposed pairs with their axes of rotation crossing and in a plane offset from the axis of said tube, the conical faces of each pair of opposed grinding wheels extending, respectively, into the openings of one of said oppositely disposed openings in said tube to simultaneously grind a pair of opposite faces of such article as said article is presented at said openings and to feed said article lengthwise of said tube.

3. A machine according to claim 2 wherein the conical face of each grinding wheel which extends into an opening in the tube is coarser adjacent the periphery of the wheel than adjacent the center of the wheel.

AUGUST JOPP.